United States Patent
Zhao et al.

(10) Patent No.: US 11,440,777 B2
(45) Date of Patent: Sep. 13, 2022

(54) CONTROLLING SYSTEM CONSOLE FOR ELECTRIC HOISTS AND CONTROLLING SYSTEM WITH THE SAME

(71) Applicant: Shanghai Huiyan Intelligence Technology Co., Ltd., Shanghai (CN)

(72) Inventors: Yingjun Zhao, Shanghai (CN); Haifeng Gu, Shanghai (CN); Ronghua Zhai, Shanghai (CN)

(73) Assignee: Shanghai Huiyan Intelligence Technology Co., Ltd., Shanghai (CN)

( * ) Notice: Subject to any disclaimer, the term of this patent is extended or adjusted under 35 U.S.C. 154(b) by 694 days.

(21) Appl. No.: 16/419,711

(22) Filed: May 22, 2019

(65) Prior Publication Data

US 2019/0375616 A1   Dec. 12, 2019

(30) Foreign Application Priority Data

Jun. 11, 2018 (CN) .......................... 201810597446.5

(51) Int. Cl.
| | |
|---|---|
| *B66C 13/32* | (2006.01) |
| *B66C 13/18* | (2006.01) |
| *B66C 15/00* | (2006.01) |
| *B66D 1/46* | (2006.01) |
| *B66C 13/44* | (2006.01) |

(Continued)

(52) U.S. Cl.
CPC .............. *B66C 13/44* (2013.01); *B66C 13/18* (2013.01); *B66C 13/32* (2013.01); *B66C 15/00* (2013.01); *B66D 1/46* (2013.01); *G05G 9/047* (2013.01); *G05G 2009/0474* (2013.01); *H01H 25/04* (2013.01)

(58) Field of Classification Search
CPC ......... B66C 15/00; B66C 13/46; B66C 13/18; B66C 13/44; B66C 13/32; B66D 1/46; G05G 9/047; G05G 2009/0474; H01H 25/04

See application file for complete search history.

(56) References Cited

U.S. PATENT DOCUMENTS

| | | | | |
|---|---|---|---|---|
| 5,138,560 A | * | 8/1992 | Lanfer ..................... | B66C 13/46 701/23 |
| 6,744,372 B1 | * | 6/2004 | Shaw ...................... | B66C 15/06 340/685 |

(Continued)

*Primary Examiner* — John A Tweel, Jr.
(74) *Attorney, Agent, or Firm* — Marshall, Gerstein & Borun LLP (57) ABSTRACT

The present disclosure relates to a controlling system console and a controlling system. In the console, a central control component is connected to an electric hoist control device via network, enhancing transmission speed and stability of signals. The console can send a combination action control signal through a combination action control component, such that the central control component creates a combination action control instruction and sends the combination action control instruction to the electric hoist control cabinet to make the electric hoist perform combination actions. The console can further send a collaboration action control signal through a collaboration action control component, such that the central control component creates a collaboration action control instruction and sends the collaboration action control instruction to the electric hoist control cabinet to make the electric hoist to act in collaboration with other arena devices.

10 Claims, 3 Drawing Sheets

(51) Int. Cl.
  *G05G 9/047* (2006.01)
  *H01H 25/04* (2006.01)

(56) References Cited

U.S. PATENT DOCUMENTS

| | | | | |
|---|---|---|---|---|
| 8,157,113 | B2* | 4/2012 | Golder | B66D 1/46 |
| | | | | 254/274 |
| 9,481,554 | B2* | 11/2016 | Lin | G01C 9/04 |
| 9,868,618 | B2* | 1/2018 | Ford | F16P 3/142 |
| 10,654,692 | B2* | 5/2020 | Norton | E21B 47/13 |
| 11,008,199 | B2* | 5/2021 | Appling, Jr. | B66C 13/40 |
| 2021/0017002 | A1* | 1/2021 | Abdallah | B66C 23/88 |

* cited by examiner

CONTROLLING SYSTEM CONSOLE FOR ELECTRIC HOISTS AND CONTROLLING SYSTEM WITH THE SAME

CROSS REFERENCE TO RELATED APPLICATIONS

This application claims priority to Chinese Patent Application No. 201810597446.5, filed with the CNIPA on Jun. 11, 2018, and entitled "HANGING SYSTEM CONSOLE AND HANGING SYSTEM", which is incorporated herein in its entirety.

TECHNICAL FIELD

The present disclosure relates to the field of controlling system for electric hoists, more particularly, to a controlling system console for electric hoists and a controlling system with the same.

BACKGROUND

Currently, hanging systems have been widely used in the fields of industrial production and stage lighting. In hanging systems, an electric hoist is a common device. The electric hoist is a common small crane driven by electricity, which may further lift and transport items with a small traveling car along a straight track or a curved track of I-beams. Therefore, electric hoists are often used as collaborative lifting apparatuses for single beam bridge cranes, gantry cranes and cantilever cranes. When using the electric hoist, it is required to be operated and controlled generally by an electric hoist control device.

Existing electric hoist control devices transmit control signals through serial port cable, resulting in significant limitations to the transmission speed and accuracy of the signals. Moreover, since a number of electric hoists connected to serial ports of the electric hoist control device is limited, it is impossible to efficiently and stably integrate speed regulation, displacement, monitoring and design of multiple electric hoists on one device. This affects scene designs of the multiple electric hoists significantly, resulting in inconvenient control. Meanwhile, the existing electric hoist control device is not capable of making the electric hoists to operate in collaboration with other devices in a performance site, resulting in low collaboration.

In summary, the existing electric hoist control devices, when controlling the electric hoists, have poor signal transmission performance, inconvenient control, and low collaboration between different devices.

SUMMARY

In view of above, an objective of the present disclosure is to provide a controlling system console and a controlling system with the console to mitigate the technical problems of poor signal transmission performance, inconvenient control and poor collaboration between different devices when the existing electric hoist control device controls the electric hoist.

In the first aspect, the embodiments of the disclosure provide a controlling system console, which includes a central control component, a combination action control component, a collaboration action control component and a network interface;

the central control component being connected respectively to the network interface, the combination action control component, the collaboration action control component, the network interface being connected to an electric hoist control cabinet via network, wherein the electric hoist control cabinet is connected to a plurality of electric hoists;

the combination action control component configured to send a combination action control signal to the central control component;

the central control component configured to create a combination action control instruction according to the combination action control signal, and send the combination action control instruction to the electric hoist control cabinet, such that the electric hoist control cabinet controls a first target electric hoist to perform a combination action, and the central control component configured to receive a feedback signal of the first target electric hoist returned from the electric hoist control cabinet and display the feedback signal, wherein the first target electric hoist is an electric hoist corresponding to the combination action control instruction;

the collaboration action control component configured to send a collaboration action control signal to the central control component;

the central control component further configured to create a collaboration action control instruction according to the collaboration action control signal, and send the collaboration action control instruction to the electric hoist control cabinet, such that the electric hoist control cabinet controls a second target electric hoist to act in collaboration with other arena devices, and the central control component configured to receive a feedback signal of the second target electric hoist returned from the electric hoist control cabinet and display the feedback signal, wherein the second target electric hoist is an electric hoist corresponding to the collaboration action control instruction, wherein the other arena devices comprises, but are not limited to, the following types: lighting device, audio device, arena machinery device and the like;

the feedback signals comprising, but not limited to: current position, operating speed, operating direction and carrying weight of each electric hoist.

With reference to the first aspect, the embodiments of the disclosure provide the first possible embodiment in the first aspect, wherein the central control component includes a computer mainboard and an Acorn RISC Machine (ARM) control board;

the computer mainboard is connected through a USB cable to the ARM control board;

the ARM control board is configured to receive a control signal sent from other components connected to the ARM control board, and send the control signal to the computer mainboard, such that the computer mainboard creates a control instruction according to the control signal and sends the control instruction to the electric hoist control cabinet.

With reference to the first aspect, the embodiments of the disclosure provide the second possible implementation in the first aspect, wherein the combination action control component includes a keypad, a joystick, a touch screen, an independent graphic card, a standard PC keyboard and a 3D spatial mouse;

the keypad is connected to the ARM control board, configured to control the combination action of the electric hoist;

the joystick is connected to the ARM control board, configured to control up-down actions of a target electric hoist, wherein the target electric hoist is an electric hoist selected by a user in the touch screen;

the touch screen is connected to an end of the independent graphic card, another end of the independent graphic card is connected to the computer mainboard, the independent graphic card is configured to assist the touch screen for display, a number of the touch screens is two configured to display a target interface, wherein the target interface comprises at least: an operating interface, a monitoring interface and a configuration interface, the monitoring interface is configured to display the feedback signal according to a target display mode, the target display mode comprises any of the followings: a list display mode, a block diagram display mode and a three-dimensional animation display mode;

the standard PC keyboard is connected to the computer mainboard, configured to edit a design scene of the electric hoist;

the 3D spatial mouse is connected to the computer mainboard, configured to edit the design scene of the electric hoist;

With reference to the first aspect, the embodiments of the disclosure provide the possible third embodiment in the first aspect, wherein the collaboration action control component includes a Longitudinal Time Code (LTC) interface and a MIDI interface;

the LTC interface is connected to the ARM control board, configured to receive an LTC time code signal sent from a central control device, and send the LTC time code signal through the ARM control board to the computer mainboard, such that the computer mainboard controls the electric hoist to act in collaboration with the other arena devices;

the MIDI interface is connected to the ARM control board, configured to receive a MIDI time code signal sent from the central control device, and send the LTC time code signal through the ARM control board to the computer mainboard, such that the computer mainboard controls the electric hoist to act in collaboration with the other arena devices;

wherein the LTC time code signal and the MIDI time code signal are the collaboration action control signal.

With reference to the first aspect, the embodiments of the disclosure provide the possible fourth embodiment in the first aspect, wherein the console further includes a safety control component;

the safety control component is configured to implement a safety control to the electric hoist;

wherein the safety control component comprises a safety lock, a pedal and an emergency stop button;

the safety lock is connected to the ARM control board, configured to be unlocked according to a matching key held by the user to allow the user to operate the console;

the pedal is connected to the ARM control board, wherein when the user steps on the pedal, operations by the user on the console are effective;

the emergency stop button is connected to the ARM control board, wherein when the emergency stop button is pressed, all the electric hoists stop actions and are not controlled by the console, and when the press triggering is released, the electric hoists revert to be controlled by the console.

With reference to the first aspect, the embodiments of the disclosure provide the possible fifth embodiment in the first aspect, wherein the console further includes an audio input component;

the audio input component is connected to the computer mainboard, configured to receive an audio signal input by the user, and convert the audio signal into an electrical signal and send the electrical signal to the computer mainboard, such that the computer mainboard creates a corresponding control instruction according to the electrical signal and sends the control instruction to the electric hoist control cabinet to implement the control of the electric hoist.

With reference to the first aspect, the embodiments of the disclosure provide the possible sixth embodiment in the first aspect, wherein the console further includes a virtual reality component;

the virtual reality component is wirelessly connected to the computer mainboard, and configured for the user to observe a stimulated movement special effect of the electric hoist.

With reference to the first aspect, the embodiments provide the possible seventh embodiment in the first aspect, wherein the console further includes an external expansion USB port, an external expansion Digital Visual Interface (DVI) video interface and a Digital Multiplex (DMX) interface;

the external expansion USB port is connected to the computer mainboard;

the external expansion DVI video interface is connected to the independent graphic card;

the DMX interface is connected to the ARM control board.

With reference to the first aspect, the embodiments of the disclosure provide the possible eighth embodiment in the first aspect, wherein a number of the network interfaces is two, a communication protocol of one of the network interfaces is a custom protocol, and a communication protocol of another network interface is the Art-Net protocol.

In the second aspect, the embodiments of the disclosure further provide a controlling system, which includes the controlling system console described in the first aspect, and further includes a network switch, an electric hoist control cabinet and an electric hoist;

the controlling system console is connected through the network switch to the same LAN as the electric hoist control cabinet for communication, wherein a number of the electric hoist control cabinets is at least one;

the electric hoist control cabinet is connected to the electric hoist, wherein one electric hoist control cabinet is connected to the plurality of electric hoist.

The embodiments of the disclosure bring the following beneficial effects:

Since the existing electric hoist control device transmits the control signal through the serial port cable, the existing electric hoist control device has poor signal transmission performance, and since it is impossible to efficiently and stably integrate speed regulation, displacement, monitoring and design of the multiple electric hoists on one device, the control is inconvenient and the existing electric hoist control device is not capable of making different devices collaborate with each other. Comparing to the existing electric hoist control device, in the controlling system console of the present disclosure, the central control component is connected to the electric hoist control cabinet via network, which improves the transmission speed and stability of signals. Moreover, the controlling system console of the present disclosure is capable of sending the combination action control signal through the combination action control component to the central control component, whereby the central control component creates the combination action control instruction, and further sends the combination action control instruction to the electric hoist control cabinet, such that the electric hoist control cabinet controls the first target electric hoist to perform the combination action. The controlling system console of the present disclosure is further capable of sending the collaboration action control signal through the collaboration action control component to the central control component, whereby the central control component creates the collaboration action control instruction, further sending the collaboration action control instruction to the electric hoist control cabinet, such that the electric hoist control cabinet controls the second target electric hoist to act in collaboration with the other arena devices, resulting in convenient control, and good collaboration between the different devices. The controlling system console of the present disclosure is further capable of monitoring and displaying the operating status of the electric hoist, resulting in good practicality and mitigating the technical problems of poor signal transmission performance, inconvenient control and poor collaboration between the different devices.

Other features and advantages of the disclosure will be set forth in the following description, and they will be partially apparent from the description or understood by the implementation of the disclosure. Objectives and other advantages of the disclosure are realized and obtained by structures specified in the specification, the claims and the drawings.

To make the understanding of the objectives, features and advantages of the disclosure more apparent and understandable, preferred embodiments will be hereinafter described in detail with reference to the accompanying drawings.

BRIEF DESCRIPTION OF THE DRAWINGS

For the purpose of illustrating the technical solutions of the embodiments of the present disclosure or of the prior art more explicitly, the accompanying drawings to be used necessarily for the description of the embodiments or of the prior art will be briefly described below. Apparently, the accompanying drawings described below are part of the embodiments of the disclosure, and accompanying drawings of the other embodiments may further be acquired based on these accompanying drawings herein without creative efforts to those skilled in the art.

REFERENCE NUMERALS 1-central control component; 2-combination action control component; 3-collaboration action control component; 4-network interface; 11-computer mainboard; 12-ARM control board; 21-keypad; 22-joystick; 23-touch screen; 24-independent graphic card; 25-standard PC keyboard; 26-3D spatial mouse; 31-LTC interface; 32-MIDI interface; 51-safety lock; 52-pedal; 53-emergency stop button; 54-audio input component; 55-virtual reality component; 56-external expansion USB port; 57-external expansion DVI video interface; 58-DMX interface; 59-switch and power interface of the power adapter.

DETAILED DESCRIPTION OF THE EMBODIMENTS

In order to make the objectives, technical solutions and advantages of the present disclosure more comprehensible, the technical solutions of the present disclosure will be described below clearly and entirely with reference to the accompanying drawings. Apparently, the described embodiments are part of the embodiments of the disclosure, instead of all of the embodiments. All other embodiments obtained by those skilled in the art based on the embodiments of the present disclosure without creative efforts, are within the scope of the present disclosure as well.

In order to facilitate the understanding of the embodiment, a controlling system console disclosed in the embodiment of the present disclosure is first introduced in detail.

Embodiment One

Figure 1:
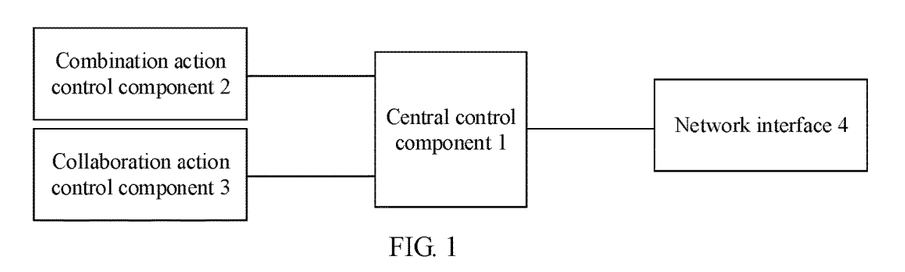
FIG. 1 is a schematic diagram illustrating a controlling system console provided by an embodiment of the disclosure.

A controlling system console is provided. Referring to FIG. 1, the console includes: a central control component 1, a combination action control component 2, a collaboration action control component 3 and a network interface 4.

The central control component 1 is respectively connected to the network interface 4, the combination action control component 2 and the collaboration action control component 3. The network interface 4 is connected to an electric hoist control cabinet via network, wherein the electric hoist control cabinet is connected to a plurality of electric hoists.

The combination action control component 2 is configured to send a combination action control signal to the central control component 1.

The central control component 1 is configured to create a combination action control instruction according to the combination action control signal, and send the combination action control instruction to the electric hoist control cabinet, such that the electric hoist control cabinet controls a first target electric hoist to perform combination actions. The central control component 1 is also configured to receive a feedback signal of the first target electric hoist from the electric hoist control cabinet and display the feedback signal, wherein the first target electric hoist is an electric hoist corresponding to the combination action control instruction.

The collaboration action control component 3 is configured to send a collaboration action control signal to the central control component 1.

The central control component 1 is also configured to create a collaboration action control instruction according to the collaboration action control signal, and send the collaboration action control instruction to an electric hoist control cabinet, such that the electric hoist control cabinet controls a second target electric hoist to act in collaboration with other arena devices. The central control component 1 is also configured to receive a feedback signal of the second target electric hoist from the electric hoist control cabinet and display the feedback signal, wherein the second target electric hoist is an electric hoist corresponding to the collaboration action control instruction. The other arena devices include, but are not limited to, the following types: lighting device, audio device, arena machinery device and the like.

The feedback signal includes, but is not limited to: current position, operating speed, operating direction, carrying weight of each electric hoist.

In the embodiment of the disclosure, the combination action control signal includes: different action control signals between different electric hoists, the same action control signal between different electric hoists, multiple different actions of an electric hoist or the like, which are the design scenes of electric hoists.

The console can implement not only combination actions of the electric hoists, but also the collaboration actions between the electric hoists and the other arena devices. The involved devices and operating processes will be described hereinafter in detail, and will not be described hereto again.

Furthermore, it should be noted that the controlling system console of the embodiment of the disclosure relates mainly to the control implemented by the controlling system of the electric hoist control cabinet and the electric hoists. Of course, this console may also be applicable in other controlling systems, which is not specifically limited in the embodiments of the disclosure.

Since the existing electric hoist control devices transmit the control signal through the serial port cable, the existing electric hoist control devices have poor signal transmission performance, and since it is impossible to efficiently and stably integrate speed regulation, displacement, monitoring and design of the multiple electric hoists on one device, the control is inconvenient and the existing electric hoist control devices are not capable of making different devices collaborate with each other. Comparing to the existing electric hoist control devices, in the controlling system console of the present disclosure, the central control component 1 is connected to the electric hoist control cabinet via network, which improves the transmission speed and stability of signals. Moreover, the controlling system console of the present disclosure is capable of sending the combination action control signal through the combination action control component 2 to the central control component 1, whereby the central control component 1 creates the combination action control instruction, and further sends the combination action control instruction to the electric hoist control cabinet, such that the electric hoist control cabinet controls the first target electric hoist to perform the combination action. The controlling system console of the present disclosure is further capable of sending the collaboration action control signal through the collaboration action control component 3 to the central control component 1, whereby the central control component 1 creates the collaboration action control instruction, and further sends the collaboration action control instruction to the electric hoist control cabinet, such that the electric hoist control cabinet controls the second target electric hoist to act in collaboration with the other arena devices, resulting in convenient control, and good collaboration between the different devices. The controlling system console of the present disclosure is further capable of monitoring and displaying the operating status of the electric hoist. The controlling system console of the present disclosure has good practicality and mitigates the technical problems of poor signal transmission performance, inconvenient control and poor collaboration between the different devices.

The above brief description introduces the control of the electric hoist by the controlling system console. Hereinafter, the involved specific content will be described in detail.

Figure 2:
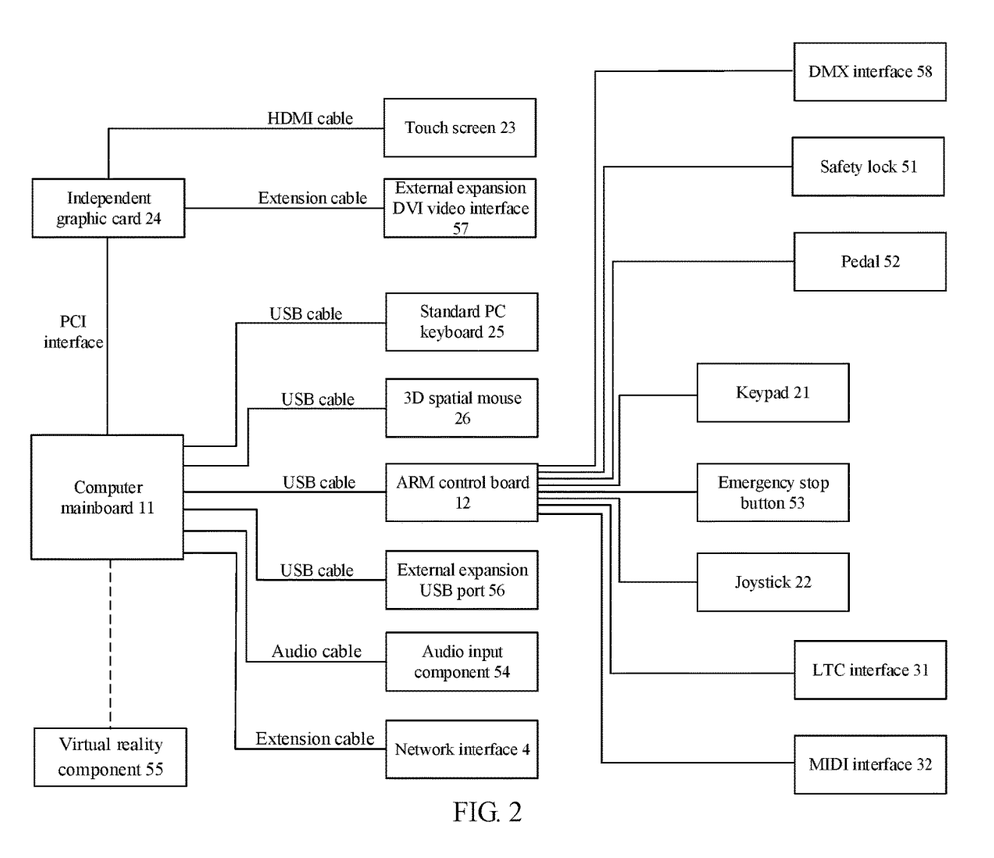
FIG. 2 is a schematic diagram illustrating another controlling system console provided by an embodiment of the disclosure.

In an optional embodiment, referring to FIG. 2, the central control component 1 includes: a computer mainboard 11 and an ARM control board 12.

The computer mainboard 11 is connected to the ARM control board 12 via a USB cable.

The ARM control board 12 is configured to receive a control signal sent from other components which are connected thereto, and send the control signal to the computer mainboard 11, such that the computer mainboard 11 creates a control instruction according to the control signal, and sends the control instruction to the electric hoist control cabinet.

Specifically, a system software is running on the computer mainboard 11. The ARM control board 12 is configured to control the other components which cannot be connected to the computer mainboard 11 directly. When a user has operated these components or an interface has received an input signal, the ARM control board 12 may detect these control signals, and package them in USB data packets to send to the computer mainboard 11 through the USB cable, thereby improving the transmission speed and stability of signals, such that the computer mainboard 11 creates the control instruction according to the information.

In an optional embodiment, referring to FIG. 2, the combination action control component 2 includes, a keypad 21, a joystick 22, a touch screen 23, an independent graphic card 24, a standard PC keyboard 25 and a 3D spatial mouse 26.

The keypad 21 is connected to the ARM control board 12, configured to control the combination action of the electric hoist.

The joystick 22 is connected to the ARM control board 12, configured to control up-down actions of a target electric hoist, wherein the target electric hoist is an electric hoist selected by the user in the touch screen 23.

The touch screen 23 is connected to an end of the independent graphic card 24, and another end of the independent graphic card 24 is connected to the computer mainboard 11. The independent graphic card 24 is configured to assist the touch screen 23 for display. A number of the touch screens is two, which are configured to display a target interface, wherein the target interface includes at least: an operating interface, a monitoring interface, a configuration interface. The monitoring interface is configured to display the feedback signal according to a target display mode. The target display mode includes any of the following: list display mode, block diagram display mode, and three-dimensional animation display mode.

The standard PC keyboard 25 is connected to the computer mainboard 11, configured to edit the design scenes of electric hoists.

The 3D spatial mouse 26 is connected to the computer mainboard 11, configured to edit the design scenes of electric hoists.

Specifically, in a process of designing a certain scene, a corresponding program is launched to realize different action special effects of all the electric hoists within the same time period by setting parameters of the different electric hoists (including operating speed, target location, operating direction or the like) through the keypad 21. The user may monitor data in real time with the touch screen 23 to determine the accuracy of the scene, and may correct the data in real time with the input devices such as the standard PC keyboard 25 and the 3D spatial mouse 26 (it is easier to move the cursor in three-dimensional space by using this mouse, and the three-dimensional space is animation space of the monitoring interface of the touch screen 23 displayed in three-dimensional).

The console provides the joystick 22 and the keypad 21, which may realize the programming and control of all the combination actions of the electric hoists in cooperation with the use of the touch screen 23, the standard PC keyboard 25 and the 3D spatial mouse. The joystick 22 and the keypad 21 are connected to the ARM control board 12 through scan lines. When the user operates the joystick 22 and the keypad 21, the ARM control board 12 will detect a corresponding signal, and convert it into a USB signal to transmit to the computer mainboard 11. The keypad 21 and the joystick 22 acting as programmable control areas, are capable of reducing a large number of manual operations and improving work efficiency.

The console provides a variety of convenient operation means such as the touch screen 23, the standard PC keyboard 25, the 3D spatial mouse 26 or the like. The two touch screens 23 are connected to the independent graphic card 24 through HDMI cables. The use of multiple display screens mitigates overlapping of an operating window and a monitoring window, which is more convenient for the user to control the movements of the electric hoists and monitor the operating status of the electric hoists in real time simultaneously.

The console provides a high-performance independent graphic card 24. The independent graphic card 24 is connected to the computer mainboard 11 via a PCI interface. The independent graphic card 24 may be configured to process relative complicated scene graphics, for example, simulating the operating special effects of the electric hoists, rendering 3D animation of the electric hoists running in real time, or the like, which are capable of visualizing the scene special effects more intuitively.

The process of scene design is described in detail below.

In a process of designing a certain scene, after a corresponding program is launched by following the steps, the console may identify IDs of all the connected electric hoist control cabinets, and store the definitions thereto.

The scene design mode is activated. A corresponding key light will turn into a highlight status when the corresponding setting keypad 21 is pressed, while a key signal is transmitted to the ARM control board 12. After the key signal is identified and converted by the ARM control board 12, the key signal is transmitted through the USB to the computer mainboard 11.

After the computer mainboard 11 receives the processable key signal, the application program assigns the instruction to the system software according to the transmission signal. The touch screen 23 displays synchronously the corresponding information being set, where the program setting is completed.

Referring to the above-mentioned control method, the user may custom a key store scene, and the above-mentioned process is repeated if it is desired to add or update some parameters.

When the user needs to call a defined scene for an actual electric hoist control, the console system implements the control by converting through software the relevant information into the control instruction to further send to the corresponding electric hoist control cabinet, by which the corresponding instruction is executed.

In an optional embodiment, referring to FIG. 2, the collaboration action control component 3 includes an LTC interface 31 and a MIDI interface 32.

The LTC interface 31 is connected to the ARM control board 12, configured to receive an LTC time code signal sent by the central control device, and send the LTC time code signal to the computer mainboard 11 through the ARM control board 12, such that the computer mainboard 11 controls the electric hoist to act in collaboration with the other arena devices.

The MIDI interface 31 is connected to the ARM control board 12, configured to receive a MIDI time code signal sent by the central control device, and send the MIDI time code signal to the computer mainboard 11 through the ARM control board 12, such that the computer mainboard 11 controls the electric hoist to act in collaboration with the other arena devices.

The LTC time code signal and the MIDI time code signal are the collaboration action control signal.

Specifically, the console has a function of parsing LTC time code signals and MIDI time code signals. The LTC interface and the MIDI interface 32 are connected to the ARM control board 12. When the LTC time code signal or the MIDI time code signal is input into the interface, the ARM control board 12 converts and packages it into a USB signal, and sent it through the USB cable to the computer mainboard 11 for processing by the system software on the computer mainboard 11.

When it is needed to implement a collaboration operation between the different devices in the performance site, for example, a synchronous output between the electric hoist, the lighting device, the audio device, the arena machinery device or the like, a time code triggering mode may be added to the scene design on the console, thereby achieving the above mentioned synchronization effect, which provides the possibility of a variety of performances on the modern stage.

In an optional embodiment, referring to FIG. 2, the console further includes: a safety control component.

The safety control component is configured to implement safety control of the electric hoist.

The safety control component includes: a safety lock 51, a pedal 52 or an emergency stop button 53.

The safety lock 51 is connected to the ARM control board 12, configured to be unlocked according to a matching key held by the user, to allow the user to operate the console.

The pedal 52 is connected to the ARM control board 12, wherein when the user steps on the pedal 52, operations by the user on the console are effective.

The emergency stop button 53 is connected to the ARM control board 12, wherein when the emergency stop button 53 is pressed, all the electric hoists stop actions and are not controlled by the console, while when the press triggering is released, the electric hoists revert to be controlled by the console.

Specifically, the console is provided with the security lock 51, which is matched with the corresponding key. It is required to insert the key and unlock the lock prior to the use each time, otherwise the console is inaccessible. Only the users who are subject to a safety training and are proficient in the various operations of the console, can be qualified to use the key. This design is to prevent the console from being improperly operated by an unrelated person, which results in improper movements of the electric hoists causing an undesired safety accident.

When the user operates the console, the pedal 52 must be stepped on, otherwise the console cannot be operated. This design is to prevent the console from being mistouched in an accidental case, which results in improper movements of the electric hoists causing an undesired safety accident.

When the user presses the emergency stop button 53, all the electric hoists of the system will stop the actions immediately and no longer be controlled by the console. When the emergency stop button 54 is released, the electric hoists are then controllable again.

The safety lock 51, the pedal 52 and the emergency stop button 53 constitute a triple device operation safety mechanism to prevent all undesired safety accidents. This improves significantly the safety of the entire control system. These three safety control components are connected to the ARM control board 12. When the ARM control board 12 detects a signal, the signal will be converted into the USB signal to send to the mainboard. After the signal is received, the system software on the mainboard will send a corresponding instruction immediately.

In an optional embodiment, referring to FIG. 2, the console further includes: an audio input component 54.

The audio input component 54 is connected to the computer mainboard 11, configured to receive an audio signal input by the user. The audio input component 54 converts the audio signal into an electrical signal, and sends the electrical signal to the computer mainboard 11, such that the computer mainboard 11 creates a corresponding control instruction according to the electrical signal and sends the control instruction to the electric hoist control cabinet to implement the control of the electric hoist.

In the embodiment of the disclosure, the audio input component 54 is a microphone. Of course, the audio input component 54 may also be any of other audio input components 54 in other forms, which is not specifically limited by the embodiments of the present disclosure.

The microphone is configured to input voices. The microphone is connected to the computer mainboard 11 through an audio extension cable. When a voice signal is received, the microphone converts it into the electrical signal to transmit to the computer mainboard 11. The electrical signal is processed by the system software on the computer mainboard 11 and converted into a corresponding control instruction. In other words, the operator is able to operate the electric hoist by means of speech control, such that the control of the electric hoist becomes more intelligent and user-friendly.

In an optional embodiment, referring to FIG. 2, the console further includes: a virtual reality component 55.

The virtual reality component 55 is wirelessly connected to the computer mainboard 11, and configured for users to observe stimulated movement special effects of the electric hoists.

In the embodiment of the disclosure, the virtual reality component 55 is an AR glass. Of course, the virtual reality component 55 may also be any of other virtual reality component 55 in other forms, which is not specifically limited by the embodiment of the present disclosure.

The AR glass is a head-mounted display device, and is connected to the computer mainboard 11 via wireless network, configured to provide AR virtual reality augmented technologies. When the user has designed the scene with the console, he or she can observe the simulated operation special effects of the electric hoist by wearing the AR glass. Or, when the electric hoist is actually moving in the performance site, its operation 16 status can be monitored in real time by wearing the AR glass, wherein the current position, the operation speed, the operation direction and the carrying weight of each electric hoist can be displayed on the AR glass in real time.

In an optional embodiment, referring to FIG. 2, the console further includes: an external expansion USB port 56. an external expansion DVI video interface 57 and a DMX interface 58.

The external expansion USB port 56 is connected to the computer mainboard 11.

The external expansion DVI video interface 57 is connected to the independent graphic card 24.

The DMX interface 58 is connected to the ARM control board 12.

Specifically, a plurality of external expansion USB ports 56 and external expansion DVI video interfaces 57 expanded on the console can meet the needs of users at any time.

Furthermore, the console provides a DMX interface 58. The DMX interface 58 is an interface for directly controlling the electric hoist. The interface is capable of outputting the control instruction of the DMX protocol for directly controlling the electric hoist supporting the DMX protocol. The interface is connected through a cable to the ARM control board 12. The system software on the computer mainboard 11 sends the control instruction through the USB to the ARM control board 12. The control instruction is converted into a DMX signal by the ARM control board 12, and transmitted in turn to the connected electric hoist through the DMX interface 58 to implement the control.

Optionally, a number of the network interfaces 4 is two. A communication protocol of one of the network interfaces 4 is a custom protocol, and a communication protocol of another network interface 4 is the Art-Net protocol.

Specifically, the network interfaces 4 are configured to output the control instruction to the electric hoist control cabinet in the same LAN, of which one interface is configured to output the control instruction of the custom protocol, and the other interface is configured to output the control instruction of the Art-Net standard protocol. Both the two interfaces are connected to the computer mainboard 11 through a network cable.

The interior of the console is also provided with a power adapter, which supplies power to the computer mainboard 11 with the ATX standard power.

The structure of the console is described below with a specific structural diagram, with reference to FIGS. 3 to 5.

Figure 3:
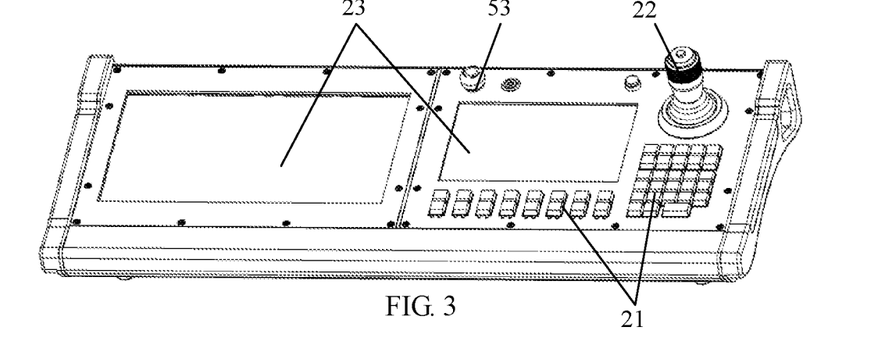
FIG. 3 is a front view schematic diagram illustrating a controlling system console provided by an embodiment of the disclosure.

As shown in FIG. 3, the keypad 21, the joystick 22 and the emergency stop button 53 are connected to the ARM control board 12 inside the console, by which the operation signals from the components are detected. The touch screen 23 is connected through a standard video cable HDMI to the independent graphic card 24 inside the console.

Figure 4:
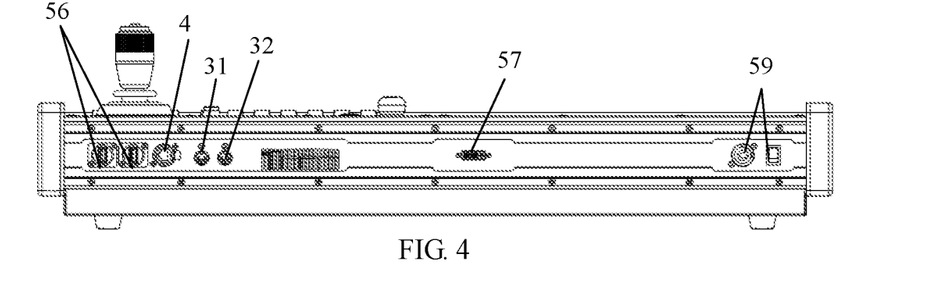
FIG. 4 is a side view schematic diagram illustrating a controlling system console provided by an embodiment of the disclosure.

As shown in FIG. 4, the external expansion USB ports 56 in the rear are connected through a USB extension cable to the computer mainboard 11 inside the console. The network port is connected through an extension cable to the network interface 4 of the computer mainboard 11 inside the console. The LTC interface 31 and the MIDI interface 32 is connected through a cable to the ARM control board 12 inside the console. The input time code signal is detected by the ARM control board 12. The external expansion DVI video interface is connected through a video extension cable to the independent graphic card 24 inside the console. A switch and a power interface of the power adapter 59 are arranged on the panel in the rear. The standard 220V AC is input via the interface, and supplies power to the computer mainboard 11 after converted by the power adapter.

Figure 5:
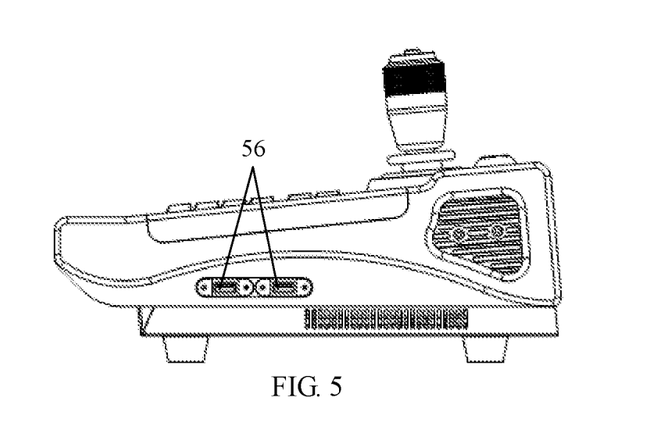
FIG. 5 is another side view schematic diagram illustrating the controlling system console provided by the embodiment of the disclosure.

As shown in FIG. 5, the external expansion USB ports 56 at a side are connected through the USB extension cable to the computer mainboard 11 inside the console.

The standard PC keyboard 25 and the 3D spatial mouse 26 are peripheral input devices, and the two input devices which are USB devices, are connected through the external expansion USB ports 56 to the console.

The pedal 52 and the safety lock 51 are peripheral safety control components, and are connected through a cable to the ARM control board 12 inside the console. The operation signals of the safety control components are detected by the ARM control board 12.

The performance parameters of the controlling system console in the present disclosure are described below, as shown in the following table.

| NAME | PARAMETER |
| --- | --- |
| Working voltage | AC~220 V |
| Processor model | i3-8100 |
| SSD | 32 GB |
| The 4th generation memory | 8 GB |
| Network broadband | 1 Gbps |
| Control channel upper limit | 1000 |
| Operating temperature | −40□~85□ |
| Application scene | studio, concert, or the like |

The controlling system console of the disclosure transmits the control signal via network, enhances the transmission speed and stability of the signals, is capable of monitoring the operating statuses of all the electric hoists of the system, and increases the number of the controllable hoists significantly. The innovative combination action programmable logic reduces a large number of manual operations for users and improves the working efficiency. The innovative speech control function makes the control of the electric hoists more user-friendly and intelligent. The three built-in safety protection mechanisms improve significantly the safety of the entire control system during operating. The function of parsing the LTC time code signal and the MIDI time code signal may implement the collaboration operation between the different devices in performances sites.

Embodiment Two

Figure 6:
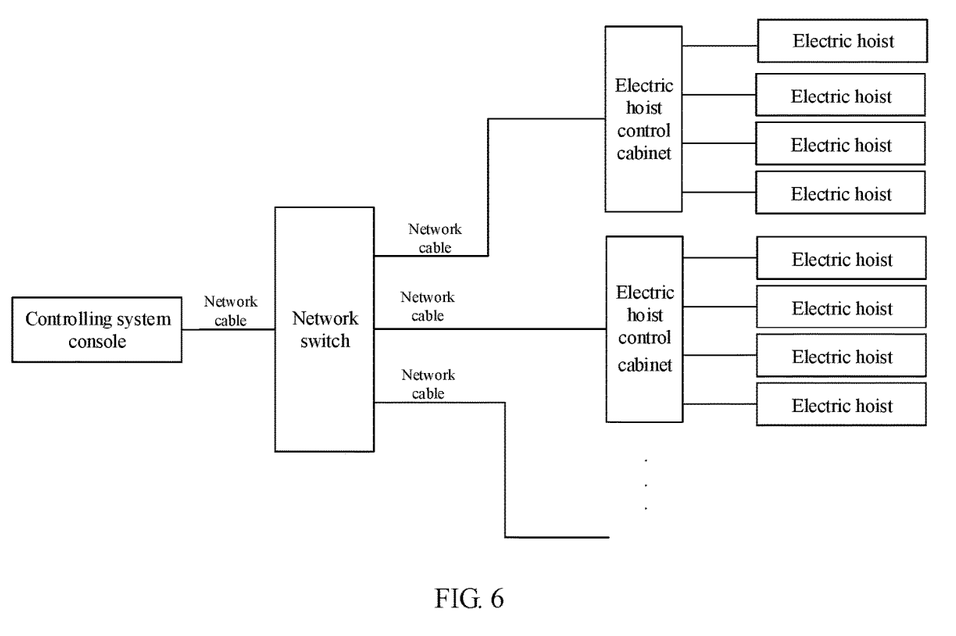
FIG. 6 is a schematic diagram illustrating a controlling system provided by an embodiment of the disclosure.

A controlling system is provided. Referring to FIG. 6, the controlling system includes the controlling system console described in Embodiment One, and further includes a network switch, an electric hoist control cabinet and an electric hoist.

The controlling system console is connected through the network switch to the same LAN as the electric hoist control cabinet for communication, wherein a number of the electric hoist control cabinets is at least one.

The electric hoist control cabinet is connected to the electric hoist, wherein an electric hoist control cabinet is connected to a plurality of electric hoists.

Specifically, the controlling system console and the electric hoist control cabinet are connected through the network switch to the same LAN. The controlling system console communicates with the electric hoist control cabinet with a custom control protocol or the Art-Net standard protocol. In general, in the same network, it is possible to have a controlling system console with a plurality of electric hoist control cabinets (supporting up to 250 electric hoist control cabinets). An electric hoist control cabinet may control the electric hoists in four branches, that is, a controlling system console may control maximal 1000 electric hoists.

The computer program product of the controlling system console and the controlling system provided by the embodiment of the disclosure includes a computer readable storage medium storing the program code. Instructions contained in the program code may be configured to perform the method described in the previous method embodiment. The specific implementation may be referred to the method embodiment, and will be not described hereto again.

Those skilled in the art may clearly understand that for the convenience and brevity of the description, the specific operating process of the system and the device described above can refer to the corresponding process in the foregoing method embodiment, and will not be described hereto again.

In addition, in the description of the embodiments of the present disclosure, unless otherwise explicitly defined, the terms "installation", "connected", and "connection" are to be understood broadly, for example, they may be a fixed connection, a detachable connection, or an integral connection; a mechanical connection or an electrical connection; a direct connection, a connection via an intermediate medium, or a connection between two interiors of components. For those skilled in the art, the specific meanings of the above terms in the present disclosure may be understood in context.

The functions may be stored in a computer readable storage medium if implemented in the form of a software functional unit and sold or used as a standalone product. Based on such understanding, the essence of the technical solution or the part contributing to the prior art of the technical solution of the present disclosure, or a part of the technical solution may be embodied in the form of a software product. The computer software product is stored in a storage medium and includes one or more instructions to cause a computer device (which may be a personal computer, a server, a network device or the like) to perform all or part of the steps of the method of various embodiments of the present disclosure. The foregoing storage medium includes: a USB disk, a mobile hard disk, a read-only memory (ROM), a random access memory (RAM), a magnetic disk, an optical disk or various media capable of storing a program code.

In the description of the present disclosure, it should be noted that the orientation or positional relationship indicated by the terms "central", "upper", "lower", "left", "right", "vertical", "horizontal", "inside", "outside" or the like is based on the orientation or positional relationship shown in the drawings, and is merely intended to facilitate the description of the disclosure and simplify the description, rather than to indicate or imply that the referred device or component has a specific orientation, or is constructed or operated in a specific orientation. Therefore, it cannot be construed as limitation of the disclosure. Moreover, the terms "first", "second", and "third" are used for the purpose of description only, and cannot be construed as indicating or implying relative importance.

The last thing should be noted: the embodiments described above are merely specific embodiments of the present disclosure, and are used to illustrate the technical solutions of the present disclosure, but not limited thereto. The protection scope of the present disclosure is not limited thereto. Although the present disclosure has been described in detail with reference to the foregoing embodiments, those skilled in the art should understand: any person skilled in the art may implement modifications or obvious changes, or replacement of part of the technical features with equivalents in respect with the technical solutions described in the foregoing embodiments within the technical scope disclosed in the present disclosure. However, the modifications, variations, and substitutions are not intended to make the technical solutions to depart from the spirit and scope of the technical solutions of the embodiments of the present disclosure, and fall within the scope of the present disclosure. Therefore, the scope of the disclosure should pertain to the scope of the claims.

What is claimed is:

1. A controlling system console, comprising a central control component, a combination action control component, a collaboration action control component and a network interface;
the central control component being connected respectively to the network interface, the combination action control component, and the collaboration action control component; the network interface being connected to an electric hoist control cabinet via network, wherein the electric hoist control cabinet is connected to a plurality of electric hoists;
the combination action control component being configured to send a combination action control signal to the central control component;
the central control component being configured to create a combination action control instruction according to the combination action control signal, and send the combination action control instruction to the electric hoist control cabinet, such that the electric hoist control cabinet controls a first target electric hoist to perform a combination action, and the central control component being configured to receive a feedback signal of the first target electric hoist returned from the electric hoist control cabinet and display the feedback signal, wherein the first target electric hoist is an electric hoist corresponding to the combination action control instruction;
the collaboration action control component being configured to send a collaboration action control signal to the central control component;
the central control component being further configured to create a collaboration action control instruction according to the collaboration action control signal, and send the collaboration action control instruction to the electric hoist control cabinet, such that the electric hoist control cabinet controls a second target electric hoist to act in collaboration with other arena devices, and the central control component being configured to receive a feedback signal of the second target electric hoist returned from the electric hoist control cabinet and display the feedback signal, wherein the second target electric hoist is an electric hoist corresponding to the collaboration action control instruction, wherein the other arena devices comprise, but are not limited to, the following types: a lighting device, an audio device, an arena machinery device; and
the feedback signals comprising, but not limited to: a current position, an operating speed, an operating direction, and a carrying weight of each electric hoist.

2. The console of claim 1, wherein the central control component comprises a computer mainboard and an ARM control board;
the computer mainboard being connected through a USB cable to the ARM control board; and
the ARM control board being configured to receive a control signal sent from other components connected to the ARM control board, and send the control signal to the computer mainboard, such that the computer mainboard creates a control instruction according to the control signal and sends the control instruction to the electric hoist control cabinet.

3. The console of claim 2, wherein the combination action control component comprises a keypad, a joystick, a touch screen, an independent graphic card, a standard PC keyboard or a 3D spatial mouse;
the keypad being connected to the ARM control board, configured to control the combination action of the electric hoist;
the joystick being connected to the ARM control board, configured to control up-down actions of a target electric hoist, wherein the target electric hoist is an electric hoist selected by a user in the touch screen;
the touch screen being connected to an end of the independent graphic card, another end of the independent graphic card being connected to the computer mainboard, the independent graphic card being configured to assist the touch screen for display, a number of the touch screens being two and configured to display a target interface, wherein the target interface comprises at least: an operating interface, a monitoring interface and a configuration interface, the monitoring interface is configured to display the feedback signal according to a target display mode, and the target display mode comprises any of the followings: a list display mode, a block diagram display mode and a three-dimensional animation display mode;
the standard PC keyboard being connected to the computer mainboard, configured to edit a design scene of the electric hoist; and
the 3D spatial mouse being connected to the computer mainboard, configured to edit the design scene of the electric hoist.

4. The console of claim 2, wherein the collaboration action control component comprises an LTC interface and a MIDI interface;
the LTC interface being connected to the ARM control board, configured to receive an LTC time code signal sent from a central control device, and send the LTC time code signal through the ARM control board to the computer mainboard, such that the computer mainboard controls the electric hoist to act in collaboration with the other arena devices;
the MIDI interface being connected to the ARM control board, configured to receive a MIDI time code signal sent from the central control device, and send the LTC time code signal through the ARM control board to the computer mainboard, such that the computer mainboard controls the electric hoist to act in collaboration with the other arena devices; and
wherein the LTC time code signal and the MIDI time code signal are the collaboration action control signal.

5. The console of claim 2, wherein the console further comprises a safety control component;
the safety control component being configured to implement a safety control to the electric hoist;
wherein the safety control component comprises a safety lock, a pedal and an emergency stop button;
the safety lock being connected to the ARM control board, configured to be unlocked according to a matching key held by the user to allow the user to operate the console;
the pedal being connected to the ARM control board, wherein when the user steps on the pedal, operations by the user on the console are effective; and
the emergency stop button being connected to the ARM control board, wherein when the emergency stop button is pressed, all the electric hoists stop actions and are not controlled by the console, and when the press triggering is released, the electric hoists revert to be controlled by the console.

6. The console of claim 2, wherein the console further comprises an audio input component;

the audio input component being connected to the computer mainboard, configured to receive an audio signal input by the user, and convert the audio signal into an electrical signal and send the electrical signal to the computer mainboard, such that the computer mainboard creates a corresponding control instruction according to the electrical signal and sends the control instruction to the electric hoist control cabinet to implement the control of the electric hoist.

7. The console of claim 2, wherein the console further comprises a virtual reality component;

the virtual reality component being wirelessly connected to the computer mainboard, and configured for the user to observe a stimulated movement special effect of the electric hoist.

8. The console of claim 3, wherein the console further comprises an external expansion USB port, an external expansion DVI video interface and a DMX interface;

the external expansion USB port being connected to the computer mainboard;

the external expansion DVI video interface being connected to the independent graphic card; and the DMX interface being connected to the ARM control board.

9. The console of claim 1, wherein a number of the network interfaces is two, a communication protocol of one of the network interfaces is a custom protocol, and a communication protocol of another network interface is the Art-Net protocol.

10. A controlling system, wherein the controlling system comprises the controlling system console of claim 1, and further comprises a network switch, an electric hoist control cabinet and an electric hoist;

the controlling system console being connected through the network switch to the same LAN as the electric hoist control cabinet for communication, wherein a number of the electric hoist control cabinets is at least one;

the electric hoist control cabinet being connected to the electric hoist, wherein one electric hoist control cabinet is connected to the plurality of electric hoist.

* * * * *